(12) United States Patent
Stover et al.

(10) Patent No.: US 9,839,179 B2
(45) Date of Patent: Dec. 12, 2017

(54) RIDE-ON VEHICLE WITH OPERATOR ACCESS ASSIST BAR

(71) Applicant: The Toro Company, Bloomington, MN (US)

(72) Inventors: Dale A. Stover, Plymouth, MN (US); Todd A. Porter, Rosemount, MN (US)

(73) Assignee: THE TORO COMPANY, Bloomington, MN (US)

( * ) Notice: Subject to any disclaimer, the term of this patent is extended or adjusted under 35 U.S.C. 154(b) by 0 days.

(21) Appl. No.: 14/302,761

(22) Filed: Jun. 12, 2014

(65) Prior Publication Data

US 2014/0290201 A1 Oct. 2, 2014

Related U.S. Application Data

(63) Continuation of application No. 13/778,643, filed on Feb. 27, 2013, now Pat. No. 8,794,660.

(51) Int. Cl.
*A01D 34/64* (2006.01)
*A01D 34/82* (2006.01)
*A01D 67/00* (2006.01)

(52) U.S. Cl.
CPC .......... *A01D 34/64* (2013.01); *A01D 34/824* (2013.01); *A01D 67/00* (2013.01); *Y10T 16/44* (2015.01); *Y10T 16/466* (2015.01); *Y10T 16/473* (2015.01); *Y10T 16/4713* (2015.01)

(58) Field of Classification Search
CPC .... A01D 34/001; A01D 34/64; A01D 34/824; A01D 34/866
USPC ....... 280/727; 16/110.1, 421, 426, 427, 429; 296/1.02
See application file for complete search history.

(56) References Cited

U.S. PATENT DOCUMENTS

| | | | |
|---|---|---|---|
| 3,347,575 A | 10/1967 | Morris | |
| 3,366,406 A | 1/1968 | Morris | |
| 3,514,931 A | 6/1970 | Solheim | |
| 3,583,518 A | 6/1971 | Bichel et al. | |
| 4,626,016 A | 12/1986 | Bergsten | |
| 5,396,915 A * | 3/1995 | Bomar ............... | A45B 11/00 135/16 |
| 6,343,668 B1 * | 2/2002 | Dean .................. | A01D 34/64 180/315 |
| 6,877,764 B2 | 4/2005 | Sagol | |
| 7,090,276 B1 | 8/2006 | Bruford et al. | |

(Continued)

OTHER PUBLICATIONS

CDC California Case Report: 10CA007. [Retrieved from the Internet Aug. 8, 2015]. <URL:http://www.cdc.gov/niosh/face/stateface/ca/10CA007.htm>.*

(Continued)

*Primary Examiner* — Barry Gooden, Jr.
(74) *Attorney, Agent, or Firm* — Mueting, Raasch & Gebhardt, P.A.

(57) ABSTRACT

An assist handle for assisting an operator with climbing on to, or off of, a ground maintenance vehicle such as a mower, and a ground maintenance vehicle incorporating the same. The assist handle includes, in one embodiment, a grip portion movable between a deployed position, wherein the grip portion is positioned at a deployed elevation configured to assist the operator with ingress to, or egress from, a platform such as a seat; and a stowed position, wherein the grip portion is positioned at a stowed elevation lower than the deployed elevation.

13 Claims, 7 Drawing Sheets

(56) References Cited

U.S. PATENT DOCUMENTS

| | | |
|---|---|---|
| 7,096,530 B2 | 8/2006 | Goulet |
| 7,530,619 B1 | 5/2009 | Bruford et al. |
| 7,712,293 B1 | 5/2010 | Recker |
| 7,744,141 B2 | 6/2010 | Saionji et al. |
| 8,087,481 B2 | 1/2012 | Trefz et al. |
| 8,132,289 B2 | 3/2012 | Hahn |
| 8,157,039 B2 | 4/2012 | Melvin et al. |
| 8,234,755 B1 | 8/2012 | Brand et al. |
| 8,251,423 B1 | 8/2012 | Lingle |
| 8,678,457 B1* | 3/2014 | Duderstadt ............... 296/1.02 |
| 8,794,660 B1 | 8/2014 | Stover et al. |
| 8,985,660 B1* | 3/2015 | Weber ............... B60R 3/005 |
| | | 16/422 |
| 2001/0037634 A1* | 11/2001 | Schick ............... A01D 34/64 |
| | | 56/15.9 |
| 2002/0088091 A1 | 7/2002 | Grote et al. |
| 2002/0166313 A1* | 11/2002 | Gloudemans et al. ........ 56/14.9 |
| 2004/0112414 A1* | 6/2004 | Palmer ............... A45B 11/00 |
| | | 135/19 |
| 2005/0120485 A1 | 6/2005 | Sebastien |
| 2005/0183409 A1 | 8/2005 | Barrier |
| 2005/0194512 A1* | 9/2005 | Collins ............... A47G 25/12 |
| | | 248/534 |
| 2006/0236670 A1 | 10/2006 | Glasford et al. |
| 2006/0288682 A1* | 12/2006 | Samejima et al. ............ 56/15.9 |
| 2008/0174145 A1 | 7/2008 | Saionji et al. |
| 2008/0190084 A1 | 8/2008 | Piontek |
| 2009/0031687 A1 | 2/2009 | Elhardt et al. |
| 2009/0056492 A1 | 3/2009 | Trefz et al. |
| 2009/0322052 A1 | 12/2009 | Ruehl |
| 2010/0242176 A1 | 9/2010 | Newkirk et al. |
| 2011/0067934 A1 | 3/2011 | Dong et al. |
| 2011/0283456 A1 | 11/2011 | Herman |
| 2013/0020821 A1 | 1/2013 | Abe et al. |
| 2014/0167375 A1* | 6/2014 | Stark ............... B62D 3/00 |
| | | 280/86.751 |
| 2014/0203587 A1* | 7/2014 | Krishnan et al. ............... 296/62 |
| 2014/0331628 A1* | 11/2014 | Fichera ............... A01D 34/001 |
| | | 56/10.1 |
| 2016/0106030 A1* | 4/2016 | Lundgren ............... A01D 34/82 |
| | | 296/1.02 |

OTHER PUBLICATIONS

"DB Mower Innovations: Donbar" datasheet [online]. DB Mower Innovations, Blaine, Minnesota, Copyright 2014 [retrieved on Jun. 20, 2014]. Retrieved from the Internet: <URL:http://web.archive.org/web/20140613153018/http://www.dbmower.com/>; Jun. 13, 2014, 1 pg.

"Country Clipper Mower Accessories," Power Equipment Trade, Jan./Feb. 2014, p. 20.

* cited by examiner

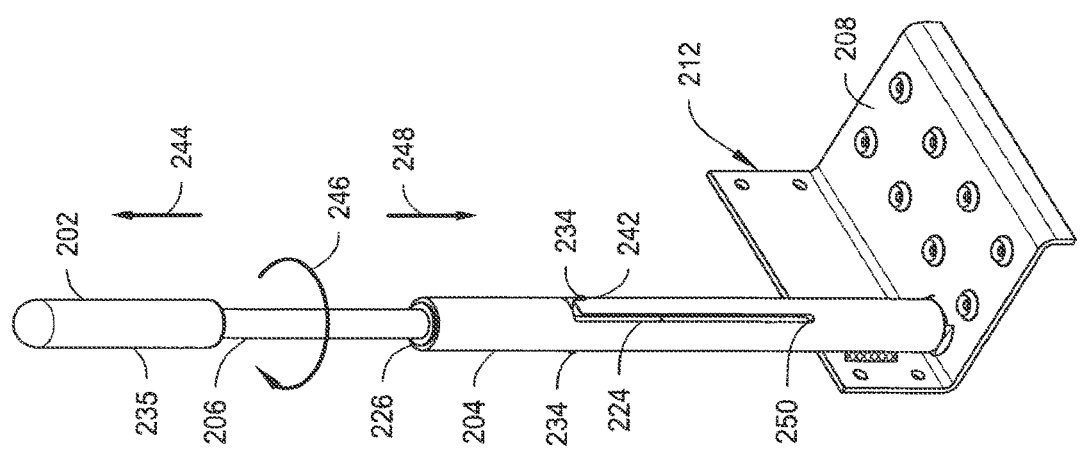

RIDE-ON VEHICLE WITH OPERATOR ACCESS ASSIST BAR

This application is a continuation of U.S. patent application Ser. No. 13/778,643, filed Feb. 27, 2013, which is incorporated herein by reference in its entirety.

Embodiments of the present invention relate generally to ground maintenance vehicles such as riding lawn mowers, and, more particularly, to apparatus for assisting an operator with stepping onto, and/or off of the vehicle.

BACKGROUND

Ground maintenance vehicles for performing a variety of tasks are known. For instance, vehicles configured for mowing, fertilizing, aerating, dethatching, vacuuming/blowing, and the like are common. While embodiments of the present invention may be applicable to a variety of such vehicles, they will, for the sake of brevity, be described with respect to riding lawn mowers.

Traditional riding mowers, e.g., those generally having four wheels wherein the front wheels are conventionally steerable by a steering wheel or the like, are in common use by homeowners and professionals alike. However, for professional landscape contractors and others mowing lawns having numerous obstacles, tight spaces, and/or intricate borders, mowers having zero-turning-radius (ZTR) capability are often preferred. As the name implies, "ZTR" generally indicates a vehicle having a zero or comparatively small turning radius, i.e., a vehicle that is highly maneuverable.

ZTR vehicles such as riding mowers typically include a chassis and at least one drive wheel located on each side (left and right) of the chassis. The drive wheels may be independently powered by a vehicle engine (e.g., via a hydraulic motor) so that, while one wheel may rotate in a first direction at a first speed, the other wheel may rotate in the same or different direction at the same or different speed. Rotating one drive wheel for forward motion while simultaneously rotating the other drive wheel for rearward motion, may cause the mower to spin generally about a turning center located between the drive wheels, thus executing a sharp turn.

While configurations vary, the drive wheels are often controlled by a twin lever control system. In this configuration, pivoting motion control levers are provided and positioned side-by-side and slightly forward of an operator's seat. Each control lever may be operatively connected to (and thus independently control) a particular drive wheel (e.g., the left lever may control the speed and direction of the left drive wheel, while the right lever may provide the same control for the right drive wheel). When the control levers are advanced forwardly in unison from a neutral position (e.g., via pivoting about an axis transverse to the direction of travel), the drive wheels may cause the mower to move forwardly in a straight line. Similarly, when the control levers are retracted in unison from the neutral position, the drive wheels may cause the mower to move in the reverse direction. Steering may be accomplished by differential movement of the control levers.

ZTR control levers are often configured to additionally pivot, when in the neutral position, about an axis parallel to the direction of travel of the mower from an operative position to an inoperative position. Movement to the inoperative position may move the levers to a location that better allows operator access to the seat. However, as a result of these multiple degrees of freedom, the control levers are not universally perceived as providing a useful gripping structure (as compared, for example, to a conventional mower steering wheel) to assist the operator when climbing on, and off of, the mower. As a result, the operator may seek to grab other mower structure such as the seat or seat armrest. However, because the seat/armrest is located aft of the control levers, grasping the seat structure may not be convenient when entering the mower from the typical access location forward of the control levers.

SUMMARY

The present invention may overcome these and other issues by providing, in one embodiment, a ground maintenance vehicle configured to accommodate a ride-on operator, wherein the vehicle includes at least one movable control member operable to control one or both of a direction and a speed of the vehicle. The vehicle includes: a frame; an operator platform attached to the frame; and an assist handle operatively attached to the frame. The assist handle includes a grip portion movable between: a deployed position, wherein the grip portion is located at a deployed elevation configured to assist the operator with ingress to, or egress from, the platform; and a stowed position, wherein the grip portion is located at a stowed elevation lower than the deployed elevation.

In another embodiment, a lawn mower configured to accommodate a ride-on operator is provided, wherein the mower includes at least one movable lever operable to control one or both of a direction and a speed of the mower. The mower includes: a frame; an operator seat attached to the frame and configured to accommodate an operator in a sitting position; and an assist handle having a first tube operatively attached to the frame, and a second tube telescopingly received within the first tube. The second tube includes a grip portion, the grip portion movable between: a deployed position, wherein the grip portion is located at a deployed elevation configured to assist the operator with ingress to, or egress from, the seat; and a stowed position, wherein the grip portion is located at a stowed elevation lower than the deployed elevation.

In yet another embodiment, a zero-turning-radius riding lawn mower is provided and includes: a frame; an operator seat attached to the frame and configured to accommodate an operator in a sitting position; and two control levers positioned forward of the seat and accessible by the operator from the seat. Each of the levers is configured to pivot relative to the frame about an axis transverse to a longitudinal axis of the mower to control direction and speed of the mower. Each lever is further configured to pivot, relative to the frame about an axis parallel to the longitudinal axis, between an operative position and a seat access position. The mower further includes: an assist handle having a first tube operatively attached to the frame; and a second tube telescopingly received within the first tube. The second tube includes a grip portion, the grip portion movable between: a deployed position, wherein the grip portion is located at a deployed elevation and forward of the control levers to assist the operator with ingress to, or egress from, the seat; and a stowed position, wherein the grip portion is located at a stowed elevation lower than the deployed elevation.

The above summary is not intended to describe each embodiment or every implementation of the present invention. Rather, a more complete understanding of the invention will become apparent and appreciated by reference to the following Detailed Description of Exemplary Embodiments and claims in view of the accompanying figures of the drawing.

BRIEF DESCRIPTION OF THE VIEWS OF THE DRAWING

The present invention will be further described with reference to the figures of the drawing, wherein:

FIG. 7 is a perspective view of the handle of FIG. 1 separated from the mower and with the grip portion shown in the deployed position; and FIG. 8 is a perspective view similar to FIG. 7, but with the grip portion shown in the stowed position.

Figure 1:
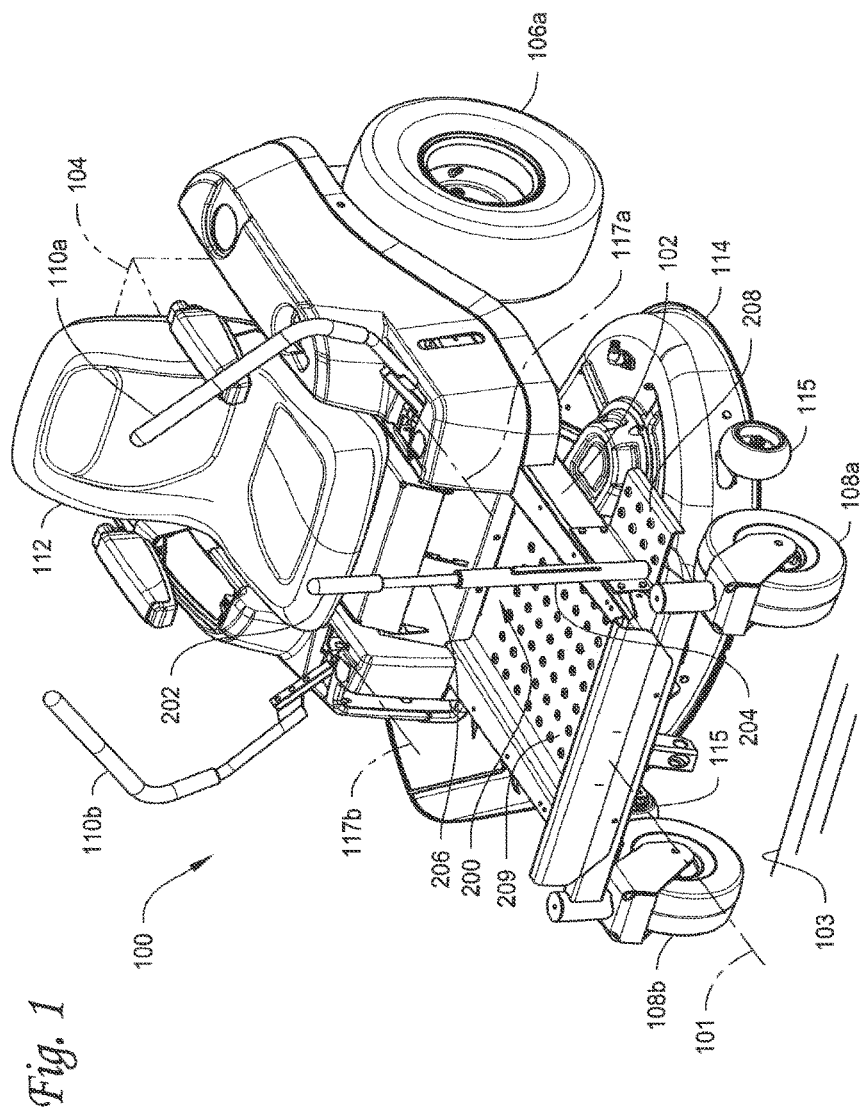
FIG. 1 is a left front perspective view of a ground maintenance vehicle, e.g., a zero-turning-radius (ZTR) lawn mower having dual control levers shown in a inoperative position, the mower incorporating an operator assist handle in accordance with one embodiment of the invention, wherein the handle is shown with a grip portion of the handle in a first or deployed position.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments of the invention. The lack of illustration/description of such structure/components in a particular figure is, however, not to be interpreted as limiting the scope of the invention in any way.

DETAILED DESCRIPTION OF EXEMPLARY EMBODIMENTS

In the following detailed description of illustrative embodiments of the invention, reference is made to the accompanying figures of the drawing which form a part hereof, and in which are shown, by way of illustration, specific embodiments in which the invention may be practiced. It is to be understood that other embodiments may be utilized and structural changes may be made without departing from the scope of the present invention.

Generally speaking, embodiments of the present invention are directed to an assist handle configured to assist an operator with climbing onto, and off of, a ground maintenance vehicle. While assist handles in accordance with embodiments of the present invention may find use on most any ground maintenance vehicle, they may be advantageously utilized with a ZTR ride-on vehicle for reasons further described below.

As used herein, "longitudinal axis" or "longitudinal direction" refers to a long axis of the mower 100, e.g., a centerline axis 101 extending in the travel or fore-and-aft direction as shown in FIG. 1. "Transverse" or "transverse axis" refers to a direction or axis extending side-to-side, e.g., a horizontal axis that is normal or transverse to the longitudinal axis 101 of the vehicle.

It is further noted that the terms "comprises" and variations thereof do not have a limiting meaning where these terms appear in the accompanying description and claims. Further, "a," "an," "the," "at least one," and "one or more" are used interchangeably herein. Moreover, relative terms such as "left," "right," "front," f orward," "aft," "rear," "rearward," "top," "bottom," "side," "upper," "lower," "above," "below," "horizontal," "vertical," and the like may be used herein and, if so, are from the perspective observed in the particular figure, or as observed when the apparatus is in a typical use orientation (see, e.g., FIG. 1). These terms are used only to simplify the description, however, and not to limit the scope of the invention in any way.

Moreover, the suffixes "a" and "b" may be used throughout this description to denote various left- and right-side parts/features, respectively. However, in most pertinent respects, the parts/features denoted with "a" and "b" suffixes are substantially identical to, or mirror images of one another. It is understood that, unless otherwise noted, the description of an individual part/feature (e.g., part/feature identified with an "a" suffix) also applies to the opposing part/feature (e.g., part/feature identified with a "b" suffix). Similarly, the description of a part/feature identified with no suffix may apply, unless noted otherwise, to both the corresponding left and right part/feature.

FIG. 1 illustrates a ground maintenance vehicle, e.g., ZTR mower 100, configured to accommodate a ride-on operator, the mower, having a chassis or frame 102 supporting a power source or prime mover, e.g., internal combustion engine 104 (shown diagrammatically). A pair of transversely opposing, ground-engaging drive members, e.g., first and second drive wheels 106 (only left drive wheel 106a visible in FIG. 1), may be coupled for powered rotation to opposing sides of the frame 102 to support and propel the mower 100 relative to a ground surface 103. A pair of front swiveling castor wheels 108a and 108b may also be provided to support the front end of the mower 100 relative to the ground surface 103.

Each drive wheel 106 may be powered, by a hydraulic drive unit (not shown) as is known in the art. While not illustrated, other drive systems, e.g., mechanical gear or pulley driven systems, may also be utilized without departing from the scope of the invention. Moreover, other power sources, e.g., one or more electric motors, could be substituted in place of the engine 104.

Although the illustrated mower has the drive wheels 106 in the rear, this configuration is not limiting. For example, other embodiments may reverse the location of the drive wheels, e.g., drive wheels in front and castor (or steerable wheels) in the back. Moreover, other configurations may use different wheel configurations altogether, e.g., a tri-wheel configuration. Still further, while embodiments of the invention are herein described with respect to riding ZTR lawn mowers (hereinafter generically referred to merely as a "mower"), those of skill in the art will realize that the invention is equally applicable to other types of ride-on mowers, as well as to most any other ride-on power utility or maintenance vehicle (e.g., tractor).

A cutting deck 114 may be attached to a lower side of the frame 102 generally between the drive wheels 106 and the castor wheels 108 in what is commonly referred to as a mid-mount configuration. The cutting deck 114 may form a downwardly-opening enclosure that defines a cutting chamber. The cutting chamber may enclose one or more rotatable cutting blades (not shown) that are each attached to a spindle journalled for rotation to an upper surface of the cutting deck. The cutting blades may be operatively powered, via the spindles, by the engine 104. During operation, power is selectively delivered to the spindles of the cutting deck 114, whereby the blades rotate at a speed sufficient to sever grass and other vegetation as the mower travels over the ground surface 103. In some embodiments, the cutting deck 114 includes deck rollers or anti-scalp wheels 115 to assist with supporting the cutting deck 114 relative to the ground surface.

The mower 100 may also include an operator platform, e.g., seat 112, attached to the frame to accommodate the operator in a sitting position during mower operation. From the seat 112, the operator may have access to various controls, e.g., engine throttle, deck engagement, engine ignition, etc.

Figure 2:
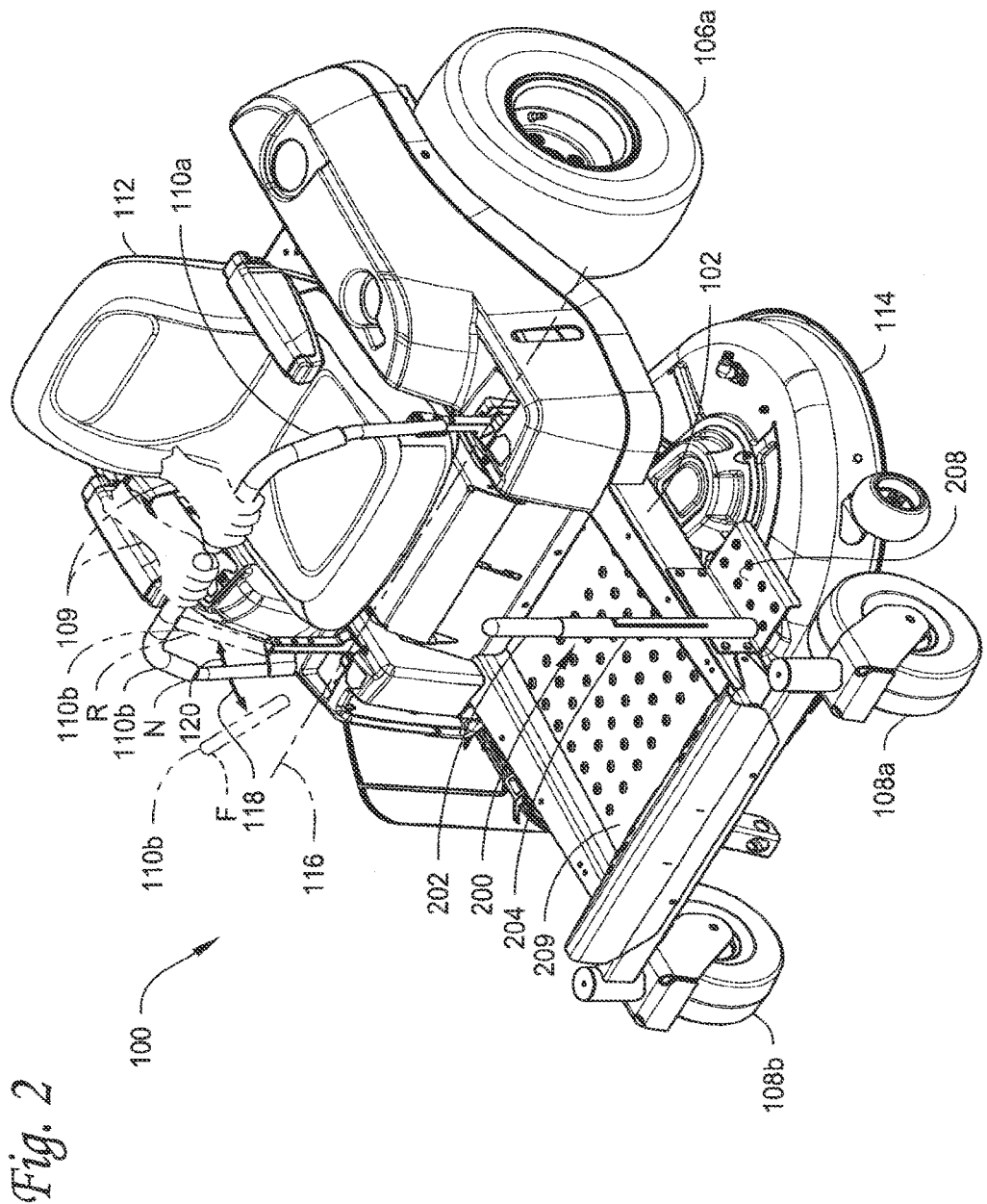
FIG. 2 is a view similar to FIG. 1, but with the grip portion of the handle shown moved to a second or stowed position and the control levers shown moved to an operative position.

As shown in FIG. 2, movable operator directional/speed control members, e.g., left and right drive control levers, 110a, 110b (referred to herein merely as "control levers"), may also be provided to permit control of mower speed and direction by the operator 109 (hands only of the operator shown in FIG. 2) from the seat 112. Each control lever 110 may be pivotally coupled relative to the frame 102 about a first, e.g., transverse, pivot axis 116. When the levers 110 are in an operative position as illustrated in FIG. 2, they may move fore-and-aft. That is, each lever 110 may pivot from a first or neutral position "N" in a first direction 118 to a second or full forward position "F" corresponding to a maximum potential forward output or velocity of the respective drive wheel 106. Each control lever 110 may also pivot about the pivot axis 116 in a second direction 120 to a third or full reverse position "R" corresponding to a maximum potential reverse output or velocity of the respective drive wheel. During operation, each control lever may move incrementally in either direction 118 or 120 to any position between the neutral position and the full forward position (as well as the full reverse position). As those of skill in the art may appreciate, powering one drive wheel 106 in the forward direction and slowing, stopping, or powering the opposite drive wheel in the reverse direction, will allow the mower to change direction.

Each control lever 110 may also pivot about a second or longitudinal axis 117 (the axis 117 being parallel to the longitudinal axis 101 of the mower 100 as shown in FIG. 1). Pivoting of each lever 110 about the axis 117 may move the lever from the operative position of FIG. 2, to an inoperative or seat access position as shown in FIG. 1. When the levers are in the inoperative position as shown in FIG. 1, improved operator access to the seat 112 (i.e., ingress to/egress from the seat) is provided.

While described herein as using a twin lever control system, it is to be understood that this configuration is not limiting as embodiments of the present invention may find application to vehicles having other, e.g., single, control lever configurations or to configurations using other types of control members.

With this introduction, an exemplary assist handle 200 will now be described. As shown in FIGS. 1 and 2, the assist handle 200 may be operatively attached to the frame 102 and further include a grip portion 202 movable between: a deployed position as shown in FIG. 1, and a stowed position as shown in FIG. 2. In the illustrated embodiment, a centerline axis of the grip portion 202 may be oriented vertically when the grip portion is in the deployed and/or stowed positions as shown in the figures.

When in the deployed position of FIG. 1, the grip portion 202 may be located at a deployed elevation configured to assist the operator with ingress to, or egress from, the platform (e.g., seat 112). Conversely, when the grip portion 202 is in the stowed position of FIG. 2, the grip portion may be located at a stowed elevation (e.g., an elevation lower than the deployed configuration) selected to reduce potential visual interference from the operator platform (e.g., seat 112). That is, when in the stowed position, the grip portion 202 may be located to reduce potential line-of-sight interference (if otherwise present) to the operator when the operator is sitting in the seat 112.

In one embodiment, the assist handle includes an elongate first (e.g., lower) tubular member (e.g., first tube 204) operatively attached to the frame 102 of the mower 100, and an elongate second (e.g., upper) tubular member (e.g., second tube 206), wherein the second tube may define the grip portion 202. In the illustrated embodiment, the second tube 206 is telescopingly received within the first tube 204, i.e., the grip portion 202 is movable from the deployed position to the stowed position by telescoping of the second tube within the first tube.

Figure 3:
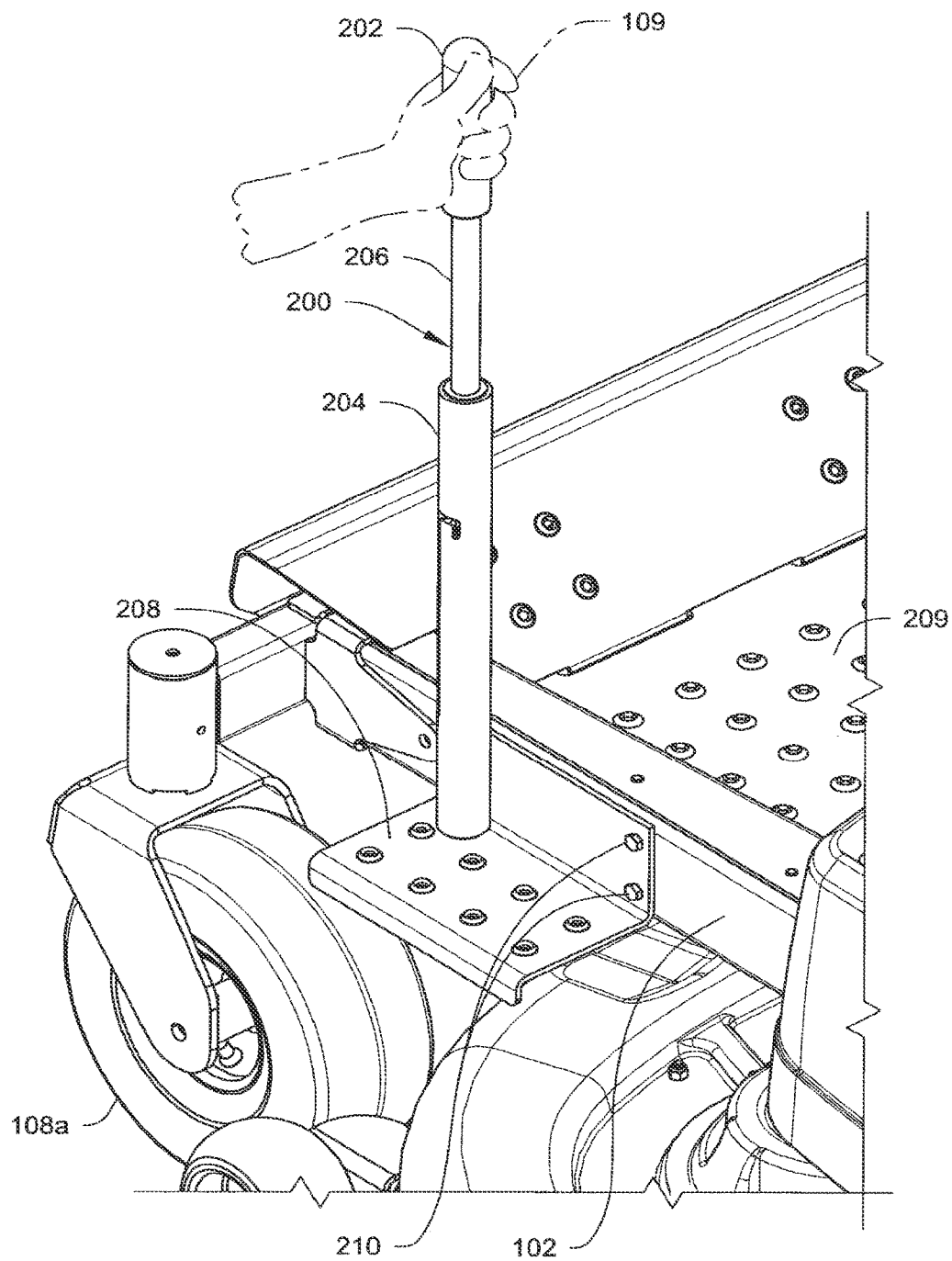
FIG. 3 is an enlarged left rear perspective view of the mower of FIG. 1 illustrating the exemplary handle in the deployed position.

As shown in FIG. 3, the handle 200 may, in one embodiment, be part of an assembly that also includes an auxiliary step 208. As further described below, the step 208 may be an integral part of the handle 200, e.g., it may be attached (e.g., welded) with a lower end of the first tube 204 such that, when the step 208 is secured to the frame 102 (e.g., with fasteners 210), the handle 200 is also operatively attached to the frame and extends upwardly from the step. Alternatively, in embodiments without the step, the handle, e.g., first tube 204, could be attached directly to the frame 102 such that it similarly extends in a vertical direction. In the illustrated embodiment, the handle 200 (e.g., the grip portion 202 and first tube 204) may be located forward of the platform (e.g., seat 112) and the control levers 110, and, in one embodiment, located lateral to the longitudinal axis 101 of the vehicle 100 as shown in the figures.

Figure 4:
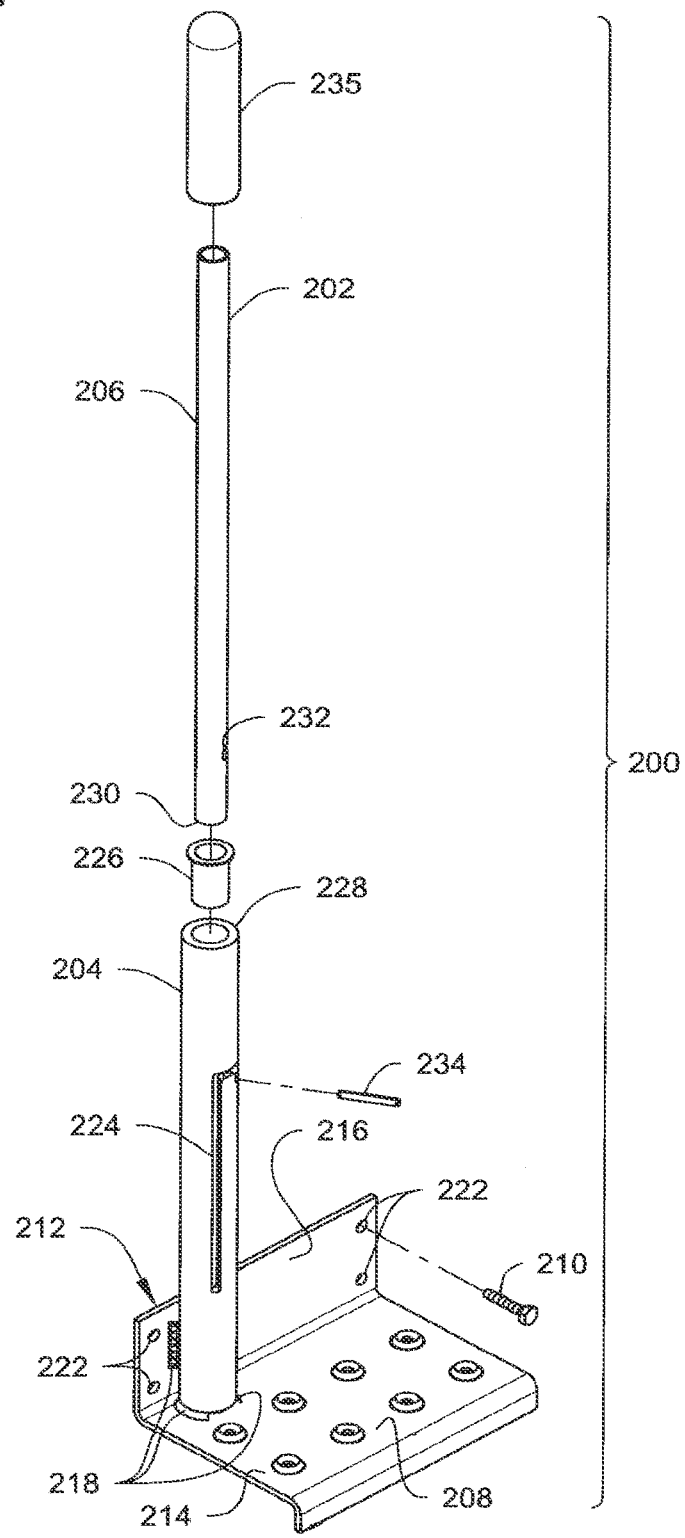
FIG. 4 is an exploded view of the exemplary handle of FIG. 1.

FIG. 4 is an exploded view of the handle 200 illustrating the component parts in accordance with one embodiment of the invention. As shown in this view, the first tube 204 may be, as stated above, fixed to the step 208 to form a base 212. The base 212 may include a right angle plate 214 having one surface that forms the step 208 and a second surface that forms attachment structure 216 to permit attachment of the base 212 to the frame 102 (see, e.g., FIG. 3). The first tube 204 may, in one embodiment, be welded to one or both of the step 208 and the attachment structure 216, e.g., via welds 218. The attachment structure 216 may be attached to the frame 102 via any acceptable method, e.g., fasteners 210 (only one shown in FIG. 4, but see FIGS. 1-3) passing through openings 222 of the attachment structure 216 and threadably engaging the frame 102. As further shown in FIG. 4, the first tube 204 may also include one or more slots 224 formed through a wall of the first tube. The slot 224 may be configured to support the second tube 206, e.g., the grip portion 202, at the deployed and stowed elevations.

A flanged bushing 226 may be secured, e.g., press-fit, into an upper end 228 of the first tube 204. The bushing 226 may define an inner diameter configured to receive an outer diameter of the second tube 206 when a lower end 230 of the second tube is inserted through the bushing 226 into the upper end 228 of the first tube.

An aperture 232 may be formed in the second tube 206, e.g., at a location near but spaced-apart from the lower end 230. In the illustrated embodiment, the aperture 232 extends completely through opposite walls of the second tube 206. Once the lower end 230 of the second tube 206 is inserted into the upper end 228 of the first tube 204, the second tube may be positioned so that the aperture 232 aligns with the slot 224. A transverse pin, e.g., roll pin 234, may then be press fit into the aperture 232 through the slot 224. The roll pin 234 is preferably of a length sufficient to extend or protrude radially outward past an outer diameter of the first tube 204 and into the slot 224. Moreover, a width of the slot 224 may be selected to receive with clearance the protruding ends of the roll pin 234. As a result, movement of the second tube 206 relative to the first tube 204 may be restrained by contact of the roll pin 234 with walls of the slot 224.

In one embodiment, the grip portion 202 of the second tube 204 may be covered with a soft sleeve 235 to provide a more comfortable gripping surface for the operator. For example, the sleeve 235 may be made from plastic, e.g., textured polyvinyl chloride, or other materials such as foam and rubber.

Figure 5:
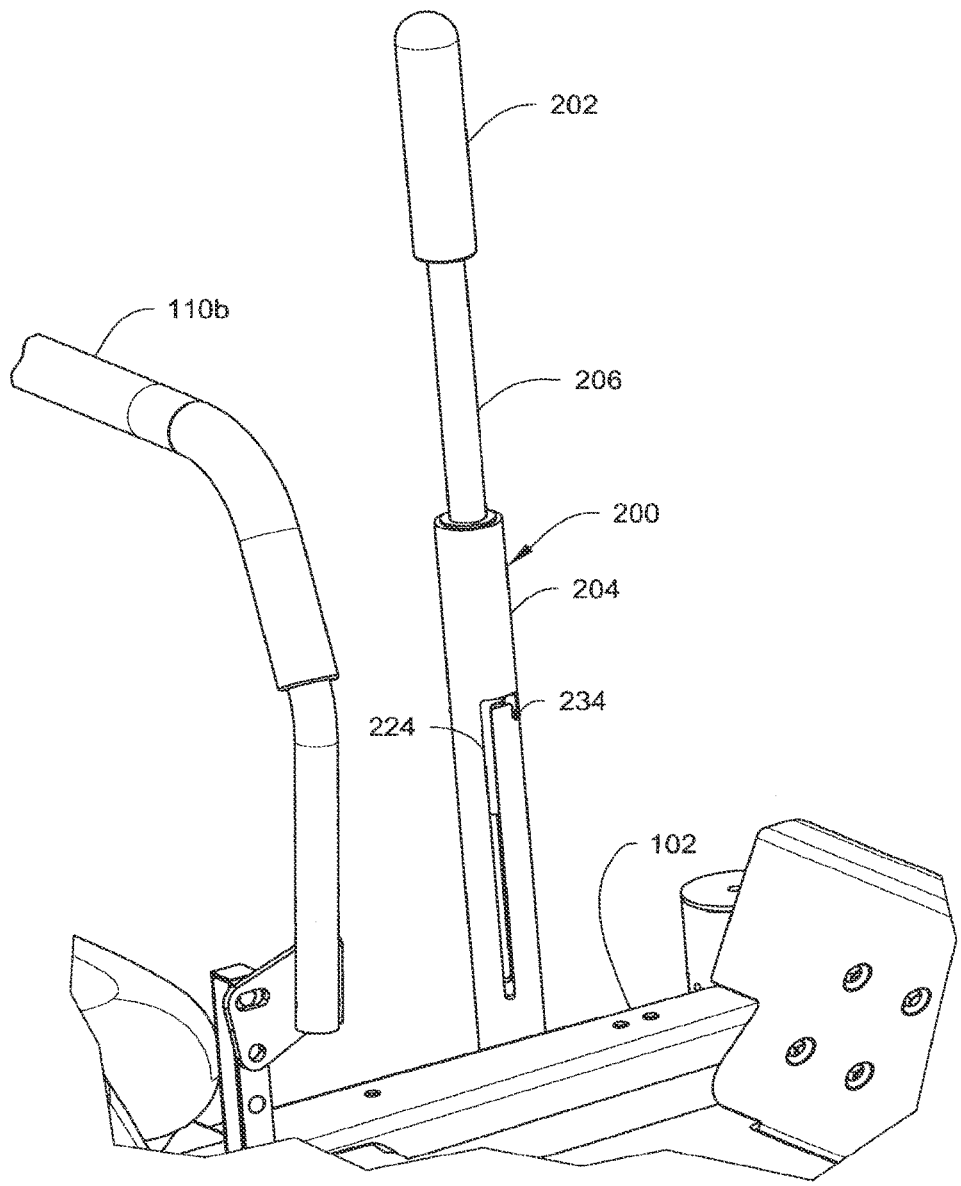
FIG. 5 is an enlarged, partial right rear perspective view of the mower of FIG. 1 illustrating the exemplary handle.

As shown in FIG. 5, the slot 224 may be provided on both sides of the first tube 204. That is the roll pin 234 may protrude from each side of the first tube 204 when the handle is assembled. However, embodiments wherein the pin 234 extends from only a single side of the first tube 204, e.g., wherein a slot 224 is provided on only a single side of the first tube, are also possible without departing from the scope of the invention.

Figure 6:
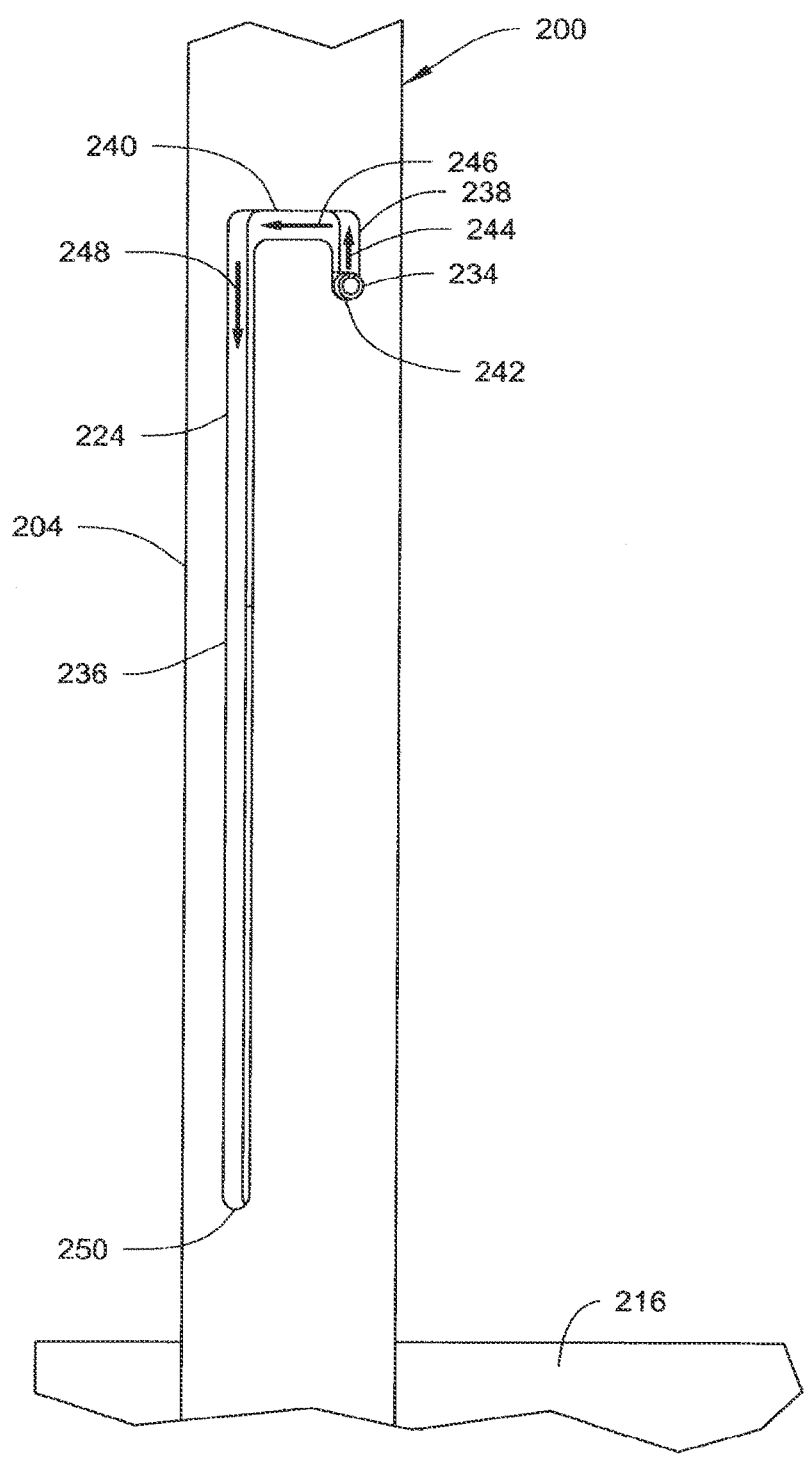
FIG. 6 is a partial side elevation view of the exemplary handle of FIG. 1 when the grip portion is in the deployed position.

An exemplary embodiment of the slot 224 is illustrated in detail in FIG. 6. As shown herein, the slot 224 may define a first longitudinal portion 236 having a first length and a second longitudinal portion 238 having a second length shorter than the first length. The second longitudinal portion 238 may be angularly offset (e.g., offset around the circumference of the first tube 204 as shown in FIG. 6) from the first longitudinal portion 236. The slot 224 may also include a circumferential portion 240 connecting the first longitudinal portion to the second longitudinal portion (e.g., near the tops of the first and second longitudinal portions). Once again, as illustrated in this view, the roll pin 234 is captivated within the slot 224, limiting the relative movement of the second tube 206 relative to the first tube 204.

FIGS. 7 and 8 illustrate movement of the grip portion 202 between the deployed position (FIG. 7) and the stowed position (FIG. 8). When desired, the grip portion 202 may be extended to the deployed elevation shown in FIGS. 1 and 7 to provide assistance to the operator with climbing onto, and off of, the mower 100. Accordingly, the operator 109 may grasp the grip portion 202, e.g., with a left hand as shown in FIG. 3, and pull himself (or herself) up to a standing position on a foot plate 209 of the mower (e.g., using the step 208) before sitting in the seat 112. To maintain the grip portion 202 in the deployed position, the roll pin 234 may rest, via gravity, against a bottom surface 242 of the second longitudinal portion 238 of the slot 224 as shown in FIGS. 6 and 7.

Once the operator has climbed onto the mower, or the assist handle 200 is no longer being used, the operator may move the grip portion 202 from the deployed position to the stowed position. In the illustrated embodiment, the grip portion 202 may be moved from the deployed to the stowed position by first displacing the grip portion upwardly, e.g., in the direction 244 shown in FIGS. 6 and 7. Upward movement of the grip portion 202 causes the roll pin 234 to move from the second longitudinal portion 238 into the circumferential portion 240 of the slot 224 (see FIG. 6). Once the grip portion 202 is sufficiently raised (e.g., once the roll pin 234 is located within the circumferential portion 240), the grip portion 202 may be rotated, as permitted by contact of the roll pin 234 within the circumferential portion 240 (e.g., in the direction 246 shown in FIGS. 6 and 7), until the roll pin enters the first longitudinal portion 236 of the slot 224 (see FIG. 6). At this point, the grip portion 202 (e.g., the second tube 206) may be pushed (or fall under its own weight) downwardly (e.g., in the direction 248 in FIGS. 6 and 7) until the roll pin rests against a surface 250 defined by a lower end of the first longitudinal portion 236 of the slot 224 as shown in FIG. 8. The grip portion 202 of the handle is then positioned at the stowed elevation selected to reduce interference, if any, with the operator's line-of-sight when seated in the seat 112 (see, e.g., FIG. 2). The control levers 110 may then be moved to the operative position of FIG. 2 and the mowing operation commenced.

At the completion of the mowing operation, the operator may reverse the steps identified above to return the grip portion 202 of the handle 200 to the elevated position (see FIG. 7) and the control levers 110 to the inoperative position of FIG. 1, thereby configuring the handle to assist with stepping down from the mower after the engine 104 is turned off.

Embodiments of the present invention may thus provide a handle to assist an operator with climbing aboard a ground maintenance vehicle such as a ZTR mower. Handles in accordance with embodiments of the present invention may also be reconfigurable to a stowed position when not in use.

Illustrative embodiments of this invention are described and reference has been made to possible variations within the scope of this invention. These and other variations, combinations, and modifications of the invention will be apparent to those skilled in the art without departing from the scope of the invention, and it should be understood that this invention is not limited to the illustrative embodiments set forth herein. Accordingly, the invention is to be limited only by the claims provided below, and equivalents thereof.

What is claimed is:

1. A zero-turning-radius ground maintenance vehicle adapted to accommodate a ride-on operator, the vehicle comprising:
   a frame;
   at least one movable, hand-operated control member coupled to the frame and operable to control one or both of a direction and a speed of the vehicle; an operator seat attached to the frame;
   a step secured to the frame; and,
   an assist handle attached on the step, the assist handle comprising a grip portion adapted to assist the operator with ingress to, or egress from, the seat, wherein the grip portion is located forward of a forwardmost edge of the seat.

2. The vehicle of claim 1, wherein the assist handle comprises a tubular member.

3. The vehicle of claim 1, wherein the assist handle is positioned lateral to a longitudinal axis of the vehicle.

4. The vehicle of claim 1, wherein the grip portion is movable between a deployed position and a stowed position.

5. The vehicle of claim 1, wherein the control member comprises a lever attached to the frame and adapted to pivot, relative to the frame, about one or more axes.

6. The vehicle of claim 5, wherein the one or more axes comprises a transverse axis.

7. A zero-turning-radius riding lawn mower, comprising:
   a frame;

an operator seat attached to the frame and adapted to accommodate a mower operator in a sitting position;

two control levers positioned near the seat and accessible by the operator from the seat, each of the levers adapted to pivot, relative to the frame about a first axis transverse to a longitudinal axis of the mower, to control direction and speed of the mower, wherein one or both of the levers is further configured to pivot, relative to the frame about a second axis, between an operative position and a seat access position;

a step secured to the frame; and, an assist handle attached on the step at a location forward of a forwardmost edge of the seat, the assist handle comprising a grip portion adapted to assist the operator with ingress to, or egress from, the seat.

8. The mower of claim 7, wherein the second axis is normal to the first axis.

9. The mower of claim 7, wherein the assist handle is operatively attached to the frame such that the grip portion is located at a position that is lateral to the longitudinal axis.

10. The mower of claim 7, wherein the step is secured to the frame at a location spaced away from the longitudinal axis.

11. The mower of claim 7, wherein the grip portion is movable between: a deployed position, wherein the grip portion is located at a deployed elevation; and a stowed position, wherein the grip portion is located at a stowed elevation lower than the deployed elevation.

12. The mower of claim 7, wherein the grip portion is spaced away from the longitudinal axis of the mower.

13. A zero-turning-radius riding lawn mower, comprising:

a frame;

an operator seat attached to the frame and adapted to accommodate a mower operator in a sitting position;

two control levers positioned near the seat and accessible by the operator from the seat, each of the levers adapted to pivot, relative to the frame about a first axis transverse to a longitudinal axis of the mower, to control direction and speed of the mower, wherein one or both of the levers is further configured to pivot, relative to the frame about a second axis, between an operative position and a seat access position;

a step secured to the frame; and, an assist handle attached on the step, the assist handle comprising a grip portion adapted to assist the operator with ingress to, or egress from, the seat, wherein the assist handle has a first tube operatively attached to the frame, and a second tube telescopingly received within the first tube, the second tube comprising the grip portion, the grip portion movable between:

a deployed position, wherein the grip portion is located at a deployed elevation forward of the control levers; and a stowed position, wherein the grip portion is located at a stowed elevation lower than the deployed elevation.

* * * * *